(12) United States Patent
Matsumura et al.

(10) Patent No.: US 11,413,830 B2
(45) Date of Patent: Aug. 16, 2022

(54) BAG SEALING APPARATUS AND BAG SEALING METHOD

(71) Applicant: PACRAFT Co., Ltd., Tokyo (JP)

(72) Inventors: Satoshi Matsumura, Iwakuni (JP); Shinichiro Hyodo, Iwakuni (JP); Kyoji Nagasaki, Iwakuni (JP)

(73) Assignee: PACRAFT CO., LTD., Tokyo (JP)

(*) Notice: Subject to any disclaimer, the term of this patent is extended or adjusted under 35 U.S.C. 154(b) by 0 days.

(21) Appl. No.: 17/531,131

(22) Filed: Nov. 19, 2021

(65) Prior Publication Data
US 2022/0176646 A1 Jun. 9, 2022

(30) Foreign Application Priority Data
Dec. 3, 2020 (JP) .............................. JP2020-201262

(51) Int. Cl.
*B29C 65/18* (2006.01)
*B29C 65/00* (2006.01)
*B29C 65/82* (2006.01)

(52) U.S. Cl.
CPC .......... *B29C 66/8511* (2013.01); *B29C 65/18* (2013.01); *B29C 65/8292* (2013.01); *B29C 66/951* (2013.01)

(58) Field of Classification Search
USPC .......................................................... 156/64
See application file for complete search history.

(56) References Cited

U.S. PATENT DOCUMENTS

| 8,689,850 B2 * | 4/2014 | Hull | ...................... B29C 66/306 |
| | | | 156/580.2 |
| 10,421,568 B2 * | 9/2019 | Yamamoto | ............ B29C 66/849 |

FOREIGN PATENT DOCUMENTS

| EP | 2808154 A1 | 12/2014 |
| WO | 2004/099751 A2 | 11/2004 |

OTHER PUBLICATIONS

Extended European Search Report dated May 2, 2022, issued in corresponding European Patent Application No. 21208745.6 (12 pgs.).

* cited by examiner

*Primary Examiner* — James D Sells
(74) *Attorney, Agent, or Firm* — Pillsbury Winthrop Shaw Pittman, LLP (57) ABSTRACT

A vibration measurement device measures vibration of at least one of the first sealing member and the second sealing member. A determination device determines quality of the sealing process according to a measurement result of the vibration measurement device from before the first sealing member and the second sealing member reach the closed position to after the first sealing member and the second sealing member reach the closed position. The sealing drive unit causes relative movement between the first sealing member and the second sealing member from an open position at a moving speed determined according to a type of the bag, to place the first sealing member and the second sealing member in the closed position.

6 Claims, 7 Drawing Sheets

BAG SEALING APPARATUS AND BAG SEALING METHOD

CROSS-REFERENCE TO RELATED APPLICATIONS

This application is based upon and claims the benefit of priority from Japanese Patent Application No. 2020-201262, filed on Dec. 3, 2020; the entire contents of which are incorporated herein by reference.

TECHNICAL FIELD

The present disclosure relates to a bag sealing apparatus and a bag sealing method.

BACKGROUND ART

In a state where two sheet bodies are nipped by a pair of sealing members while the two sheet bodies (i.e., a front sheet body and a back sheet body) constituting a bag are stacked on top of each other, a sealing process is performed by applying a high frequency (an electromagnetic wave) or ultrasonic waves from the pair of sealing members to the two sheet bodies to weld the two sheet bodies.

If a foreign matter such as contents is present between the planned sealing portions of the two sheet bodies when the sealing process is performed, the two sheet bodies cannot be sufficiently welded, which may lead to poor sealing. Due to such poor sealing, sufficient sealing strength may not be ensured, and in some cases, there is a concern that the contents may leak through the poor sealing portion, and further the appearance of the bag may be impaired.

International Publication No. 2004/099751 discloses an apparatus that measures the vibration (for example, an acceleration) of a sealed body, monitors the operating state of the sealed body based on the measurement results, and inspects the sealing quality of the package.

SUMMARY OF INVENTION

In cases where the technique disclosed in International Publication No. 2004/099751 is applied to an intermittent bagging packaging machine, there are the following concerns.

In a conventional sealing device included in an intermittent bagging packaging machine, the driving for conveying a bag and the driving for opening and closing a pair of sealing members are performed based on the output from a common drive source.

Typically, a rotary table having bag support units such as grippers provided on the outer peripheral portion is attached to the rotary shaft of a common drive source, and a cam forming a part of the mechanism for opening and closing a pair of sealing members is also attached to the rotary shaft of the common drive source. In this case, one rotation of the rotary shaft causes one rotation of the rotary table and the cam to be performed, causes one cycle of bag transportation to be performed, and causes one cycle of the opening-closing operation of the pair of sealing members to be performed.

In this way, in a case where the operation of the pair of sealing members is linked to the rotation operation of the cam, the operation speed of the pair of sealing members depends on the rotation speed of the cam, and the open/closed state of the pair of sealing members depends on the rotation state of the cam. The rotation speed and rotation state of the cam depend on the rotation speed and rotation state of the rotary shaft of the common drive source.

On the other hand, the conveyance speed and the conveyance position of bags by the bag support units also depend on the rotation speed and the rotation state of the rotary shaft of the common drive source. Therefore, the conveyance speed and the conveyance position of bags by the bag support units and the opening-closing speed and the opening-closing state of the pair of sealing members are in a state of depending on each other. For example, in order to cause a bag to be intermittently conveyed and stopped, the pair of sealing members perform the opening-closing movement only while the bag is conveyed (specifically, only while the rotary shaft is intermittently rotated), and the pair of sealing members cannot perform the opening-closing movement while the bag is stopped (specifically, while the rotary shaft is intermittently stopped).

Further, the same time is allocated to the sealing process included in a series of bagging processes as the other processes included in the series of bagging processes. Therefore, if the pair of sealing members are in a closed position for a long time so as to suit to other processes, there is a concern that the bag sealing process may be excessively performed.

Further, there is a tendency that as the time required for one cycle of a series of bagging processes becomes longer, the rotation speed of the rotary shaft of the common drive source becomes slower, and as a result, the rotation speed of the cam becomes slower and the opening-closing speed of the pair of sealing members becomes slower. As the opening-closing speed of the pair of sealing members becomes slower, the change in vibration generated in the pair of sealing members during the sealing process becomes smaller. In such a case, it may be difficult to determine the quality of the sealing process according to the measured change in vibration of the sealing members.

The present disclosure has been contrived in view of the above circumstances, and an object of the present disclosure is to provide a technique advantageous in accurately determining the quality of the sealing process for a bag.

One aspect of the present disclosure is directed to a bag sealing apparatus comprising: a bag support unit which supports a bag; a support drive unit which includes a first drive source and intermittently moves the bag support unit to position the bag at a sealing process position; a first sealing member and a second sealing member which are provided to be capable of opening and closing, and to perform a sealing process while nipping the bag by being placed in a closed position in a state where the bag is positioned in the sealing process position; a sealing drive unit which includes a second drive source provided separately from the first drive source, and opens and closes the first sealing member and the second sealing member; a vibration measurement device which measures vibration of at least one of the first sealing member and the second sealing member; and a determination device which determines quality of the sealing process according to a measurement result of the vibration measurement device from before the first sealing member and the second sealing member reach the closed position to after the first sealing member and the second sealing member reach the closed position, wherein the sealing drive unit causes relative movement between the first sealing member and the second sealing member from an open position at a moving speed determined according to a type of the bag, to place the first sealing member and the second sealing member in the closed position.

The measurement result of the vibration measurement device may include information about acceleration of vibration of the at least one of the first sealing member and the second sealing member, and the determination device may determine the quality of the sealing process according to the information about acceleration of vibration derived from the measurement result of the vibration measurement device.

Another aspect of the present disclosure is directed to a bag sealing method comprising the steps of: positioning a bag at a sealing process position; causing relative movement between a first sealing member and a second sealing member from an open position to a closed position in such a manner that the first sealing member and the second sealing member nip the bag positioned at the sealing process position to perform a sealing process of the bag; measuring vibration of at least one of the first sealing member and the second sealing member by a vibration measurement device; and determining quality of the sealing process according to a measurement result of the vibration measurement device from before the first sealing member and the second sealing member reach the closed position to after the first sealing member and the second sealing member reach the closed position, wherein the relative movement between the first sealing member and the second sealing member from the open position to the closed position is performed in such a manner that an absolute value of acceleration of vibration which occurs in the at least one of the first sealing member and the second sealing member by placing the first sealing member and the second sealing member in the closed position as a result of the relative movement is larger than an absolute value of acceleration of vibration which occurs in the at least one of the first sealing member and the second sealing member in a state where the first sealing member and the second sealing member are placed in the open position.

A maximum value of the absolute value of acceleration of vibration which occurs in the at least one of the first sealing member and the second sealing member by placing the first sealing member and the second sealing member in the closed position as a result of the relative movement may be 49.05 m/s² or more.

The first sealing member and the second sealing member may be relatively moved from the open position to the closed position at a moving speed determined according to a type of the bag.

According to the present disclosure, it is advantageous in accurately determining the quality of the sealing process for a bag.

DESCRIPTION OF EMBODIMENTS

An embodiment of the present disclosure will be described with reference to the drawings.

A bag sealing apparatus described below may be provided as a device that independently performs a bag sealing process or may be provided as a part of a bag processing apparatus (for example, a package processing apparatus) that continuously performs a plurality of processes on one bag.

Figure 1:
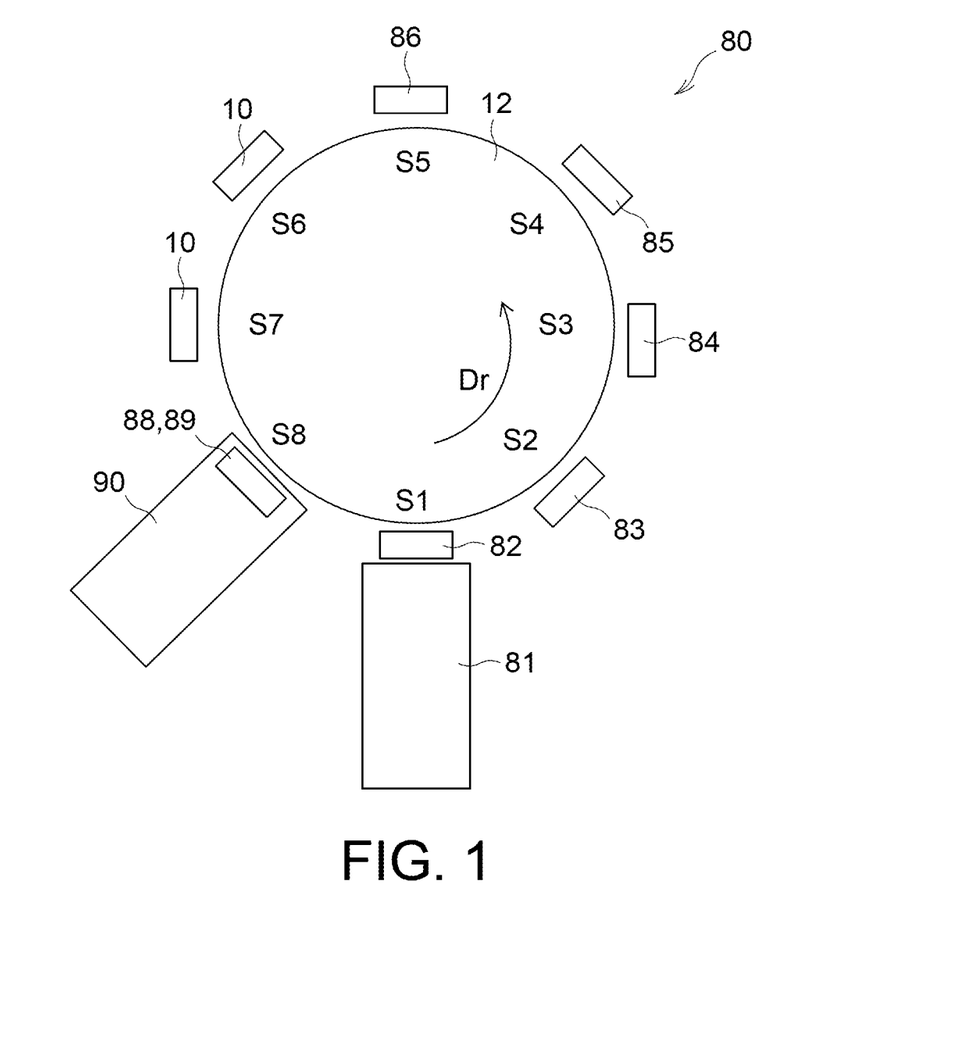
FIG. 1 is a top view showing an outline of an example of a package processing apparatus.

FIG. 1 is a top view showing an outline of an example of a package processing apparatus 80. The package processing apparatus 80 shown in FIG. 1 includes a bag supply device 81, a bag delivery device 82 (a first station S1), a bag printing device 83 (a second station S2), a print inspection device 84 (a third station S3), and a bag opening device 85 (a fourth station S4), a bag content feeding device 86 (a fifth station S5), a bag sealing apparatus 10 (a sixth station S6 and a seventh station S7), a seal portion cooling device 88 (a eighth station S8), a bag release device 89 (the eighth station S8), and a bag discharge device 90.

New bags are sequentially supplied to the package processing apparatus 80 by means of the bag supply device 81. The bag delivery device 82 delivers a bag from the bag supply device 81 to a support drive unit 12. The support drive unit 12 includes, for example, a rotary table, and intermittently moves the same number of bag support units (for example, grippers) as the number of stations in a conveyance direction (a circumferential direction) Dr. A bag delivered via the bag delivery device 82 and supported by the support drive unit 12 (specifically, each bag support unit) goes around the first station S1 to the eighth station S8 sequentially.

The bag printing device 83 prints on a bag and the print inspection device 84 inspects the printing state of a bag. The bag opening device 85 opens the mouth portion of a bag and the bag content feeding device 86 feeds contents into the inside of a bag through the opened mouth portion. The bag sealing apparatus 10 seals (in particular, performs heat sealing) the mouth portion of a bag and the seal portion cooling device 88 cools the sealed portion of a bag. The bag release device 89 releases a cooled bag to the bag discharge device 90, and the bag discharge device 90 conveys a received bag to a subsequent stage. The seal portion cooling device 88 and the bag release device 89 shown in FIG. 1 are realized by the same device. For example, the sealed portion of a bag may be gripped by cooling plates of a cooling release device that functions as the seal portion cooling device 88 and the bag release device 89 so as to cool the sealed portion, and the cooling plates may release the grip of the bag to cause the bag to drop so that the bag is released to the bag discharge device 90.

Each bag supported by the support drive unit 12 (specifically, by each bag support unit) is subjected to a process by a corresponding device during an intermittent stop at each station. As a result, the package processing apparatus 80 can continuously send out bags (i.e., product bags) on which information is printed, which contain contents and which have the sealed mouth portion, toward a subsequent stage.

The bag sealing apparatus 10 described below is applicable not only to the package processing apparatus 80 shown in FIG. 1, but also to packaging processing devices and other devices with different structures from that of the package processing apparatus 80 shown in FIG. 1. For example, the bag sealing apparatus 10 described below can be used also in a package processing apparatus in which the bag sealing apparatus 10 performs high-frequency sealing or ultrasonic sealing and the seal portion cooling device 88 is not included.

Figure 2:
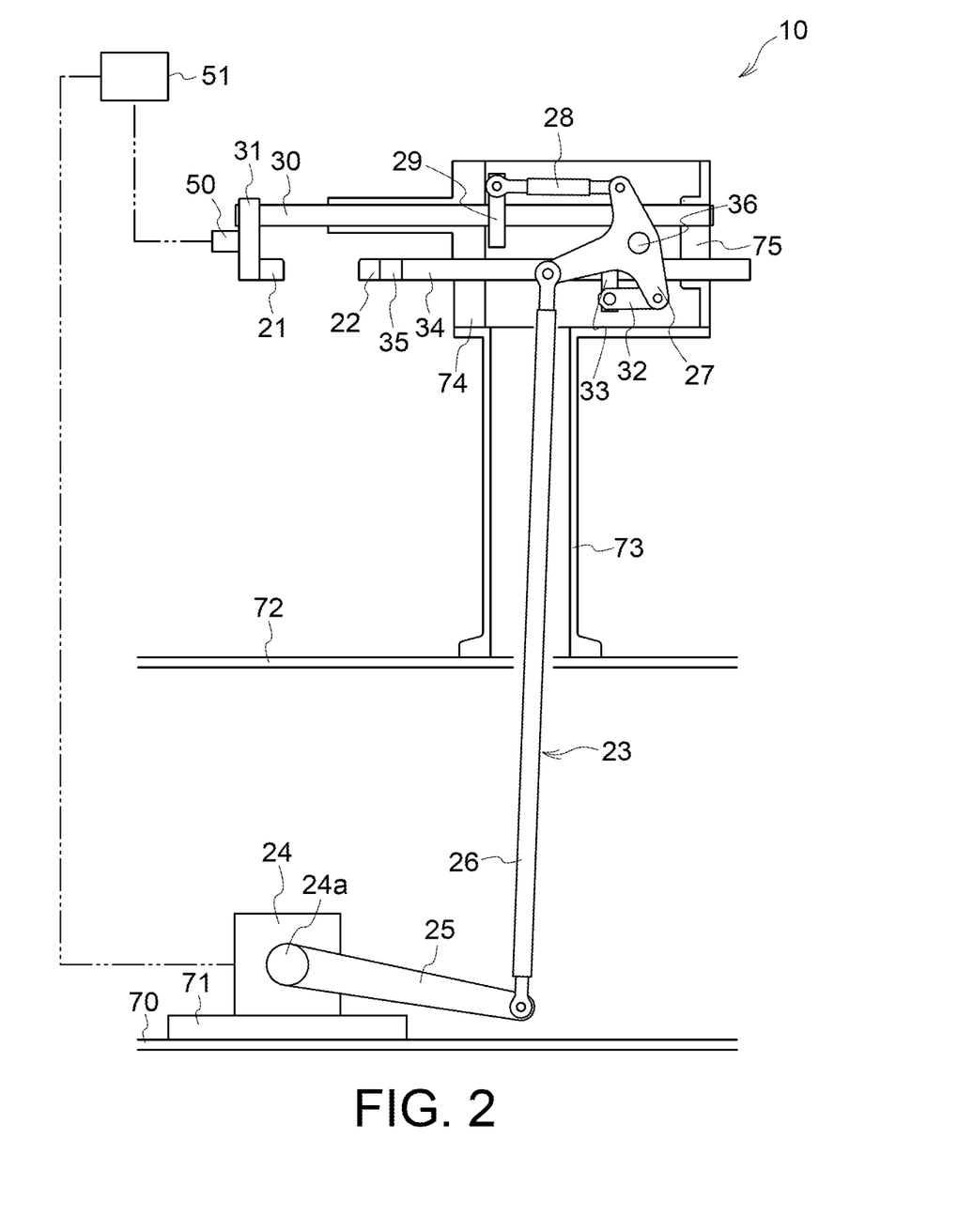
FIG. 2 is a side view of a bag sealing apparatus according to one embodiment, showing a first sealing member and a second sealing member arranged at an open position.

FIG. 2 is a side view of a bag sealing apparatus 10 of one embodiment, showing a first sealing member 21 and a second sealing member 22 arranged in an open position. In FIG. 2, for ease of understanding, a second mount 72, a stand 73, a first slide support block 74, and a second slide support block 75 are shown in cross-section, and a state of the inside of the stand 73, the first slide support block 74 and the second slide support block 75 is illustrated.

Figure 3:
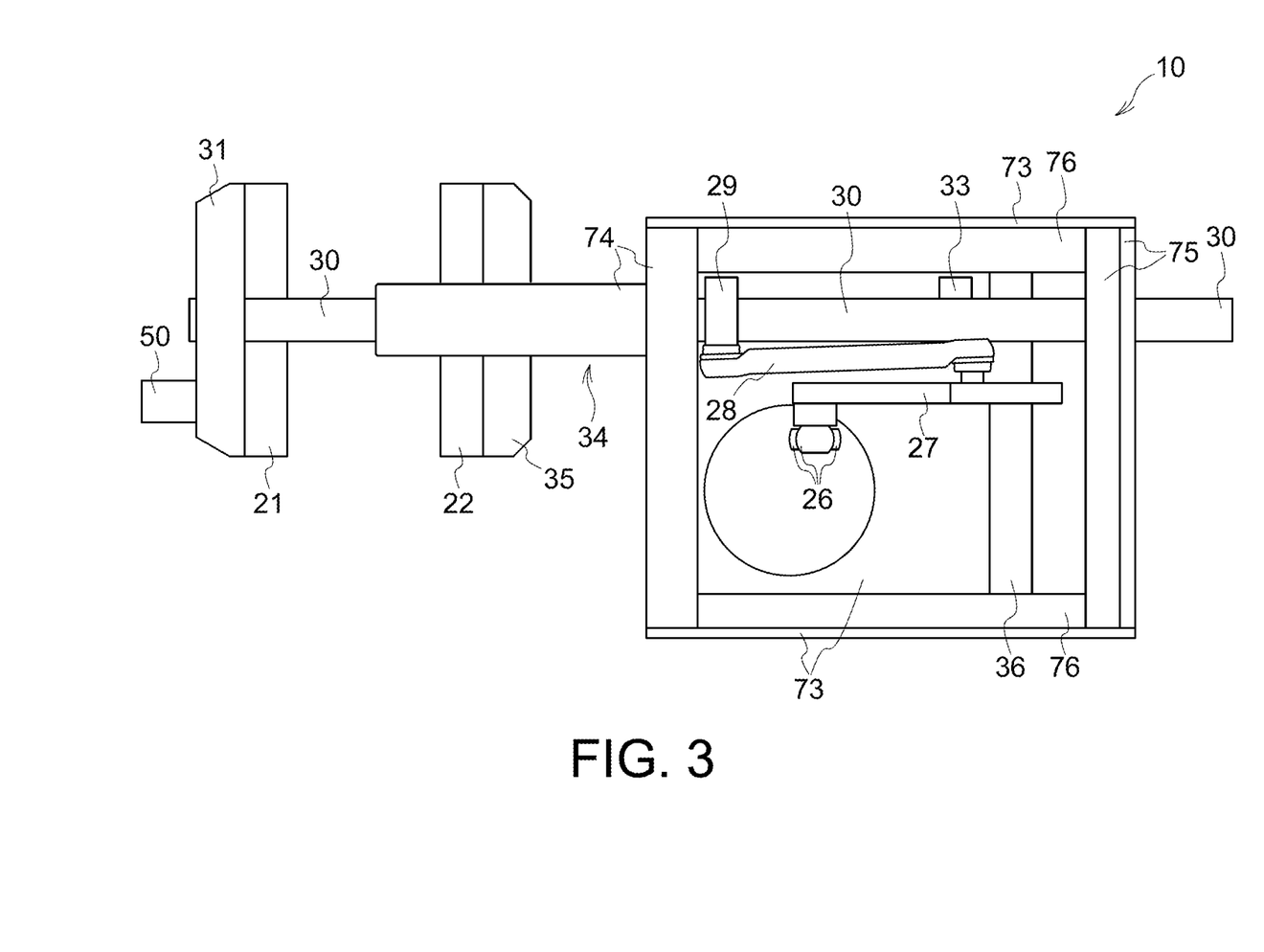
FIG. 3 is a top view of the bag sealing apparatus shown in FIG. 2
Figure 4:
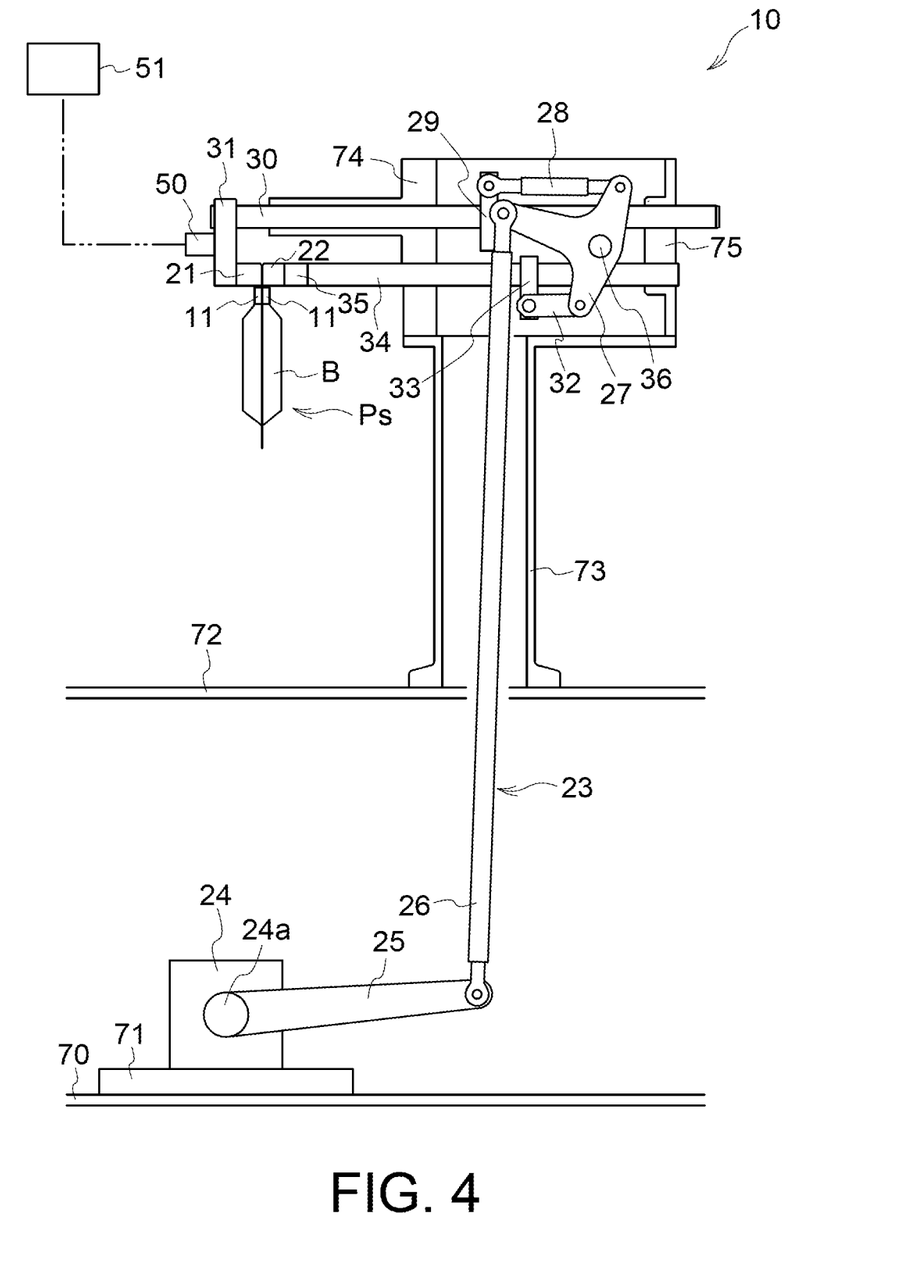
FIG. 4 is a side view of the bag sealing apparatus shown in FIG. 2, showing a bag positioned at a sealing process position and a first sealing member and a second sealing member arranged at a closed position.

FIG. 3 is a top view of the bag sealing apparatus 10 shown in FIG. 2. FIG. 4 is a side view of the bag sealing apparatus 10 shown in FIG. 2, showing a bag B positioned at a sealing process position Ps and the first sealing member 21 and the second sealing member 22 positioned at a closed position.

In the bag sealing apparatus 10 shown in FIGS. 2 to 4, a drive source for conveying a bag B and a drive source for opening-closing movement of the first sealing member 21 and the second sealing member 22 are provided separately from each other. Therefore, the conveyance of bags B and the opening and closing of the first sealing member 21 and second sealing member 22 can be performed independently of each other.

Specifically, the bag sealing apparatus 10 includes: a sealing drive unit 23 that causes the first sealing member 21 and the second sealing member 22 to open and close; and a support drive unit (not shown in FIGS. 2 to 4) that causes a bag support unit 11 supporting a bag B to move.

Each bag support unit 11 is, for example, in the form of grippers that grasp both sides of a bag B.

The support drive unit includes a first drive source (not shown in FIGS. 2 to 4) and intermittently moves a bag support unit 11 to position a bag B at the sealing process position Ps (corresponding to the sixth and seventh stations S6 and S7 shown in FIG. 1 described above). The specific configuration of the support drive unit is not limited. For example, a motor (not shown in the drawings) may form the first drive source and the support drive unit may include the motor and a rotary table (see FIG. 1) attached to the rotary shaft of the motor. In this case, by rotating the rotary table in response to the rotation of the rotary shaft, one or more bag support units 11 attached to the periphery of the rotary table can be moved in the circumferential direction.

The sealing drive unit 23 includes a second drive source 24, such as a servomotor, which is provided separately from the first drive source.

In the example shown in FIGS. 2 to 4, the second drive source 24 is fixed to a base 71 on a first mount 70. One end portion of a first swing lever 25 is fixedly attached to the rotary shaft 24a of the second drive source 24. The first swing lever 25 swings around the rotary shaft 24a in response to the rotation of the rotary shaft 24a. One end portion of a connecting shaft 26 is rotatably attached to the other end portion of the first swing lever 25 in a freely rotatable manner. A second swing lever 27 is rotatably attached to the other end portion of the connecting shaft 26 in a freely rotatable manner. The connecting shaft 26 extends in the height direction (along the vertical direction in which gravity acts) through the inside of the stand 73 fixed onto the second mount 72.

The second swing lever 27 is rotatably attached to a support shaft 36 in a freely rotatable manner while one end portion of a first advancing-retreating shaft 28 and one end portion of a second advancing-retreating shaft 32 are rotatably attached to the second swing lever 27 in a freely rotatable manner. The second swing lever 27 is provided to be freely rotatable around the support shaft 36 in a freely rotatable manner. As shown in FIG. 3, both ends of the support shaft 36 are fixed to support bodies 76 attached to the stand 73, so that the support shaft 36 is fixedly supported by the stand 73 via the support bodies 76.

The other end portion of the first advancing-retreating shaft 28 is rotatably attached to a first moving block 29 in a freely rotatable manner, and the first moving block 29 is fixed to a first drive shaft 30. The other end portion of the second advancing-retreating shaft 32 is rotatably attached to a second moving block 33 in a freely rotatable manner, and the second moving block 33 is fixed to a second drive shaft 34.

The first slide support block 74 and the second slide support block 75 are fixedly attached to the hollow stand 73. The first slide support block 74 and the second slide support block 75 are located horizontally away from each other and guide the first drive shaft 30 and the second drive shaft 34 horizontally while supporting the first drive shaft 30 and the second drive shaft 34 in such a manner that the first drive shaft 30 and the second drive shaft 34 can freely slide.

The first sealing member 21 is attached to one end of the first drive shaft 30 via a first relay block 31. The second sealing member 22 is attached to one end of the second drive shaft 34 via a second relay block 35. The first sealing member 21 and the second sealing member 22 horizontally face each other and are driven by the sealing drive unit 23 described above to perform opening and closing motions (horizontal movement motions in the present embodiment), so as to move closer to each other or to move away from each other.

For example, by rotating the rotary shaft 24a in a counterclockwise direction in FIG. 2 in a state where the first sealing member 21 and the second sealing member 22 is placed in an open position (FIG. 2), the first swing lever 25 is caused to swing upward. This causes the connecting shaft 26 to move upward, the second swing lever 27 to rotate in a clockwise direction around the support shaft 36, and the first and second advancing-retreating shafts 28 and 32 to move in directions opposite from each other (facing directions) of the horizontal direction. Specifically, the first advancing-retreating shaft 28 moves in a right direction in FIG. 2 while the second advancing-retreating shaft 32 moves in a left direction in FIG. 2.

As a result, the first sealing member 21, which is attached to the first advancing-retreating shaft 28 via the first moving block 29, the first drive shaft 30 and the first relay block 31, moves in the same direction as the first advancing-retreating shaft 28 (i.e., in a right direction in FIG. 2). The second sealing member 22, which is attached to the second advancing-retreating shaft 32 via the second moving block 33, the second drive shaft 34 and the second relay block 35, moves in the same direction as the second advancing-retreating shaft 32 (i.e., in a left direction in FIG. 2).

As a result, the first sealing member 21 and the second sealing member 22 are placed in the closed position as shown in FIG. 4. When the first sealing member 21 and the second sealing member 22 are placed in the closed position with a bag B placed at the sealing process position Ps, the first sealing member 21 and the second sealing member 22 pressurize the bag B from both sides while contacting the bag B. The first sealing member 21 and the second sealing member 22 perform a sealing process (e.g., heat sealing, high-frequency sealing or ultrasonic sealing) while nipping the bag B arranged at the sealing process position Ps in this way.

The bag sealing apparatus 10 of the present embodiment further includes a vibration measurement device 50 that measures the vibration of at least one of the first sealing member 21 and the second sealing member 22.

In the example shown in FIGS. 2 to 4, the vibration measurement device 50 is attached to the first relay block 31. The vibration measurement device 50 measures the vibration occurring in the first sealing member 21 via the first relay block 31. The vibration measurement device 50 transmits the measurement results to a control panel 51.

Figure 5:
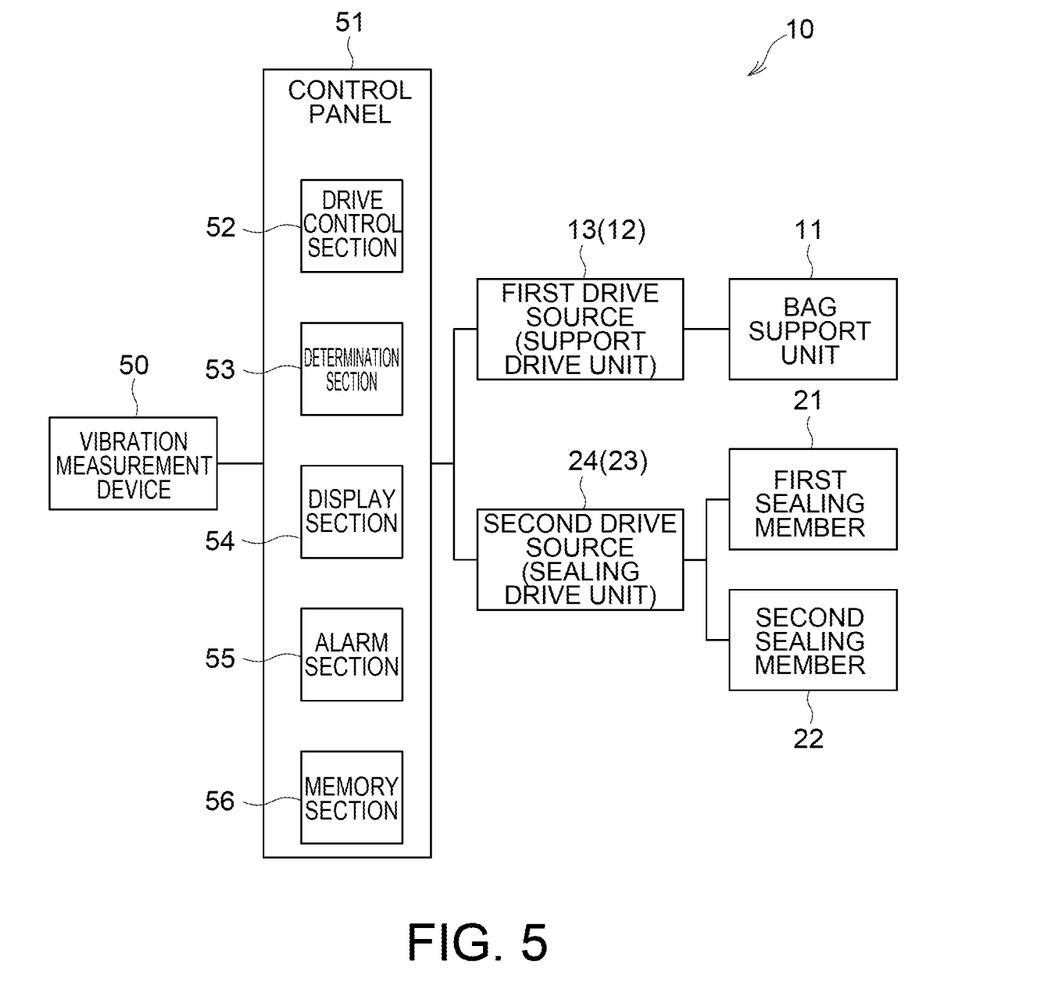
FIG. 5 is a block diagram showing an example of a control configuration of a bag sealing apparatus.

FIG. 5 is a block diagram of an example of the control configuration of the bag sealing apparatus 10.

The vibration measurement device 50 is electrically connected to the control panel 51 while the first drive source 13 of the support drive unit 12 and the second drive source 24 of the sealing drive unit 23 are electrically connected to the control panel 51.

In the example shown in FIG. 5, the control panel 51 includes a drive control section 52, a determination section 53, a display section 54, an alarm section 55, and a memory section 56.

The drive control section 52 controls the drive of the components of the bag sealing apparatus 10. For example, by driving the first drive source 13 under the control of the drive control section 52, the moving speed and the moving position of each bag support unit 11 and each bag B can be adjusted. Further, by driving the second drive source 24 under the control of the drive control section 52, the relative opening/closing speed and the relative open/closed positions of the first sealing member 21 and the second sealing member 22 can be adjusted.

The drive control section 52 controls the first drive source 13 in the example shown in FIGS. 2 to 4 and may control other elements (e.g., power transmission adjustment device (omitted in the drawings)) included in the support drive unit 12 so as to adjust the moving speed and moving position of each bag support unit 11. Likewise, if the sealing drive unit 23 has a structure different from that shown in FIGS. 2 to 4, the drive control section 52 may control an element (e.g., a power transmission adjustment device (omitted in the drawings)) included in the sealing drive unit 23 other than the second drive source 24 so as to adjust the relative opening/closing speed and the relative open/closed positions of the first sealing member 21 and the second sealing member 22.

While the specific control method of the components of the bag sealing apparatus 10 by the drive control section 52 is not limited, the drive control section 52 performs control in such a manner that each bag support unit 11, the first sealing member 21 and the second sealing member 22 operate in cooperate with each other. For example, the drive control section 52 may transmit regular synchronization signals to the support drive unit 12 (i.e., the first drive source 13 in the present embodiment) and the sealing drive unit 23 (i.e., the second drive source 24 in the present embodiment), and the support drive unit 12 and the sealing drive unit 23 may autonomously execute various operations at a timing based on the received synchronization signals. Alternatively, the drive control section 52 may emit various operation signals to each of the support drive unit 12 and the sealing drive unit 23 at desired timings, and the support drive unit 12 and the sealing drive unit 23 may execute operations in accordance with the received operation signals.

The determination section 53 determines the quality of the sealing process according to the measurement results of the vibration measurement device 50 from before the first sealing member 21 and the second sealing member 22 reach the closed position to after the first sealing member 21 and the second sealing member 22 reach the closed position.

The determination results of the determination section 53 may be displayed on the display section 54, an alarm may be issued from the alarm section 55 according to the determination results of the determination section 53, and data which associating respective bags B (e.g., their identification numbers) and the determination results may be stored in the memory section 56. An operator for the bag sealing apparatus 10 can check the display of the display section 54, listen to the alarm issued by the alarm section 55, or access the data stored in the memory section 56 in order to know the determination results of the quality of the sealing process of bags B.

[Examples of Determining the Quality of the Sealing Process]

Figure 6:
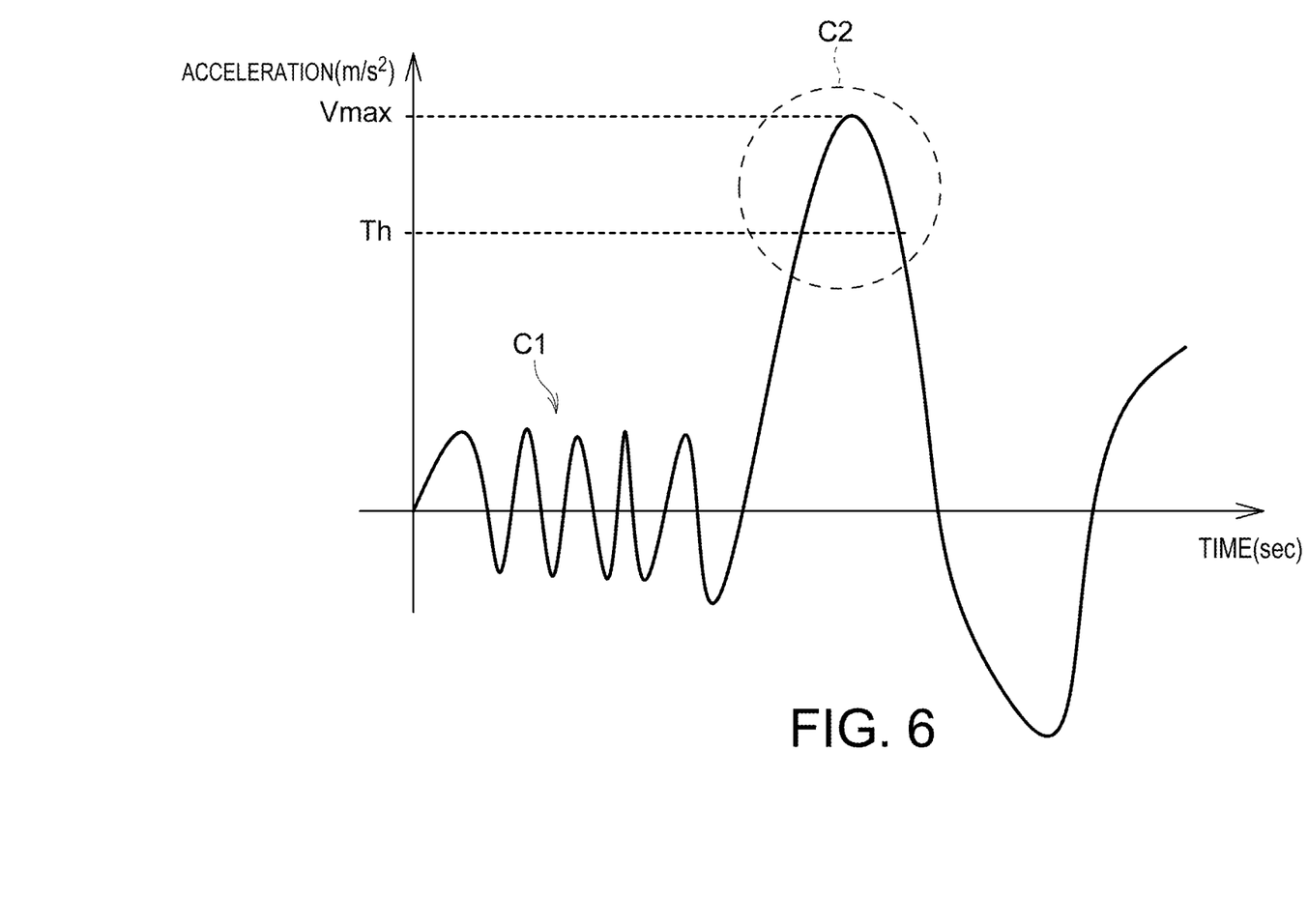
FIG. 6 shows an example of measurement results of a vibration measurement device shown in FIGS. 2 to 4, in which the vertical axis indicates the acceleration (including deceleration) occurring in the first sealing member, and the horizontal axis indicates time.

FIG. 6 shows an example of the measurement results of the vibration measurement device 50 shown in FIGS. 2 to 4, and in FIG. 6, the vertical axis shows the acceleration (including deceleration) occurring in the first sealing member 21 and the horizontal axis shows the time.

It is considered that, in the example described below, the first relay block 31 is subjected to substantially the same vibrations (e.g., the same frequency and the same amplitude) as the first sealing member 21 and therefore the measurement results of the vibration measurement device 50 indicate the state of vibration of the first sealing member 21.

In the waveform result shown in FIG. 6, the part shown above the horizontal axis indicates that the first sealing member 21 is accelerated (specifically, the first sealing member 21 speeds up) in a direction (i.e., a horizontal direction) away from a bag B located at the sealing process position Ps (or in a direction away from the second sealing member 22). On the other hand, the part shown below the horizontal axis indicates that the first sealing member 21 is accelerated (specifically, the first sealing member 21 speeds up) in a direction (i.e., a horizontal direction) approaching a bag B located at the sealing process position Ps (or in a direction approaching the second sealing member 22).

As indicated by the sign of "C1" in FIG. 6, a bag support unit 11 is basically always subjected to slight vibrations that are recognized as noise vibrations. The noise vibrations continue to work on a bag support unit 11 due to a variety of factors.

In order to seal a bag B located at the sealing process position Ps, each of the first sealing member 21 and the second sealing member 22 moves from the open position toward the closed position, decelerates rapidly in the course of the movement from the open position to the closed position, and stops at the closed position. In other words, the first sealing member 21 and the second sealing member 22 are moved from the opening position and are then arranged in the closed position, so that the first sealing member 21 and the second sealing member 22 are placed in a state where the first sealing member 21 and the second sealing member 22 are pressed against each other via a bag B.

As a result, when each of the first sealing member 21 and the second sealing member 22 stops in the closed position, each of the first sealing member 21 and the second sealing member 22 receives a large force (in particular, an impact load) from each other to vibrate with a large acceleration (including deceleration).

While the first sealing member 21 and the second sealing member 22 are placed in the open position, noise vibrations (see the sign of "C1" in FIG. 6) occur in the first sealing member 21, but no other vibration occur in the first sealing member 21. On the other hand, when the first sealing member 21 and the second sealing member 22 are stopped in the closed position, an impact force acts on the first sealing member 21 and the second sealing member 22, so that a vibration acceleration with a large absolute value (see the sign of "C2" in FIG. 6) acts on the first sealing member 21 and the second sealing member 22.

As described above, by placing the first sealing member 21 and the second sealing member 22 in the closed position in order to perform the sealing process of a bag B, large vibration acceleration acts on the first sealing member 21 and the second sealing member 22.

In this regard, however, the magnitude of the vibration acceleration acting on the first sealing member 21 and the second sealing member 22 varies depending on the presence or absence of a foreign matter (e.g., contents, etc.) between the first sealing member 21 and the second sealing member 22 (in particular, between the portions to be sealed). Specifically, the absolute value of vibration acceleration generated in the first sealing member 21 and the second sealing member 22 when the first sealing member 21 and the second sealing member 22 are placed in the closed position is smaller in cases where there is a foreign object between the first sealing member 21 and the second sealing member 22, compared to cases where there is no foreign object between the first sealing member 21 and the second sealing member 22. This is because a foreign object between the first sealing member 21 and the second sealing member 22 acts as a cushion to reduce the impact.

The determination section 53 (see FIG. 5) of the present embodiment determines, based on the measurement results of the vibration of the first sealing member 21 thus generated, whether or not a foreign object is present between the first sealing member 21 and the second sealing member 22 during the sealing process, and thus determines whether the quality of the sealing process is good or bad.

For example, the determination section 53 may obtain the peak value Vmax of the absolute value of the vibration acceleration generated in the first sealing member 21 from the measurement results of the vibration measurement device 50, and may determine whether the quality of the sealing process is good or bad based on whether or not the said peak value Vmax (absolute value) exceeds the judgment criterion value Th. When the peak value Vmax of the absolute value of vibration acceleration exceeds the judgment criterion value Th, it can be determined that there has been no foreign object between the first sealing member 21 and the second sealing member 22 during the sealing process and that the sealing process has been performed well. On the other hand, if the peak value Vmax of the absolute value of vibration acceleration is less than or equal to the judgment criterion value Th, it can be determined that there is a possibility that a foreign object (in particular, a foreign object that may interfere with the sealing process) exists between the first sealing member 21 and the second sealing member 22 during the sealing process and that a sealing process failure has occurred.

The determination section 53 may obtain the peak value Vmax of the absolute value of the vibration acceleration generated in the first sealing member 21 from the measurement results of the vibration measurement device 50 using various techniques.

For example, the determination section 53 may obtain the peak value Vmax of the absolute value of the vibration acceleration occurring in the first sealing member 21, based on only the acceleration working in a direction away from a bag B (or from the second sealing member 22) of the vibration acceleration occurring in the first sealing member 21. Further, the determination section 53 may also obtain the peak value Vmax of the absolute value of the vibration acceleration generated in the first sealing member 21, taking into account the time information of the timing at which the first sealing member 21 and the second sealing member 22 are placed in the closed position. The determination section 53 may obtain, in any way, the time information of the timing at which the first sealing member 21 and the second sealing member 22 are placed in the closed position, and may obtain the time information, for example, based on the information used when the drive control section 52 performs drive control of the sealing drive unit 23 (i.e., the second drive source 24).

Further, the judgment criterion value Th used to determine whether the sealing process is good or bad (i.e., the criterion value to be compared with the peak value Vmax of the absolute value of the vibration acceleration generated in the first sealing member 21) can be decided in advance based on various factors, such as the type of bags B and the relative movement speed of the first sealing member 21 and the second sealing member 22.

Figure 7:
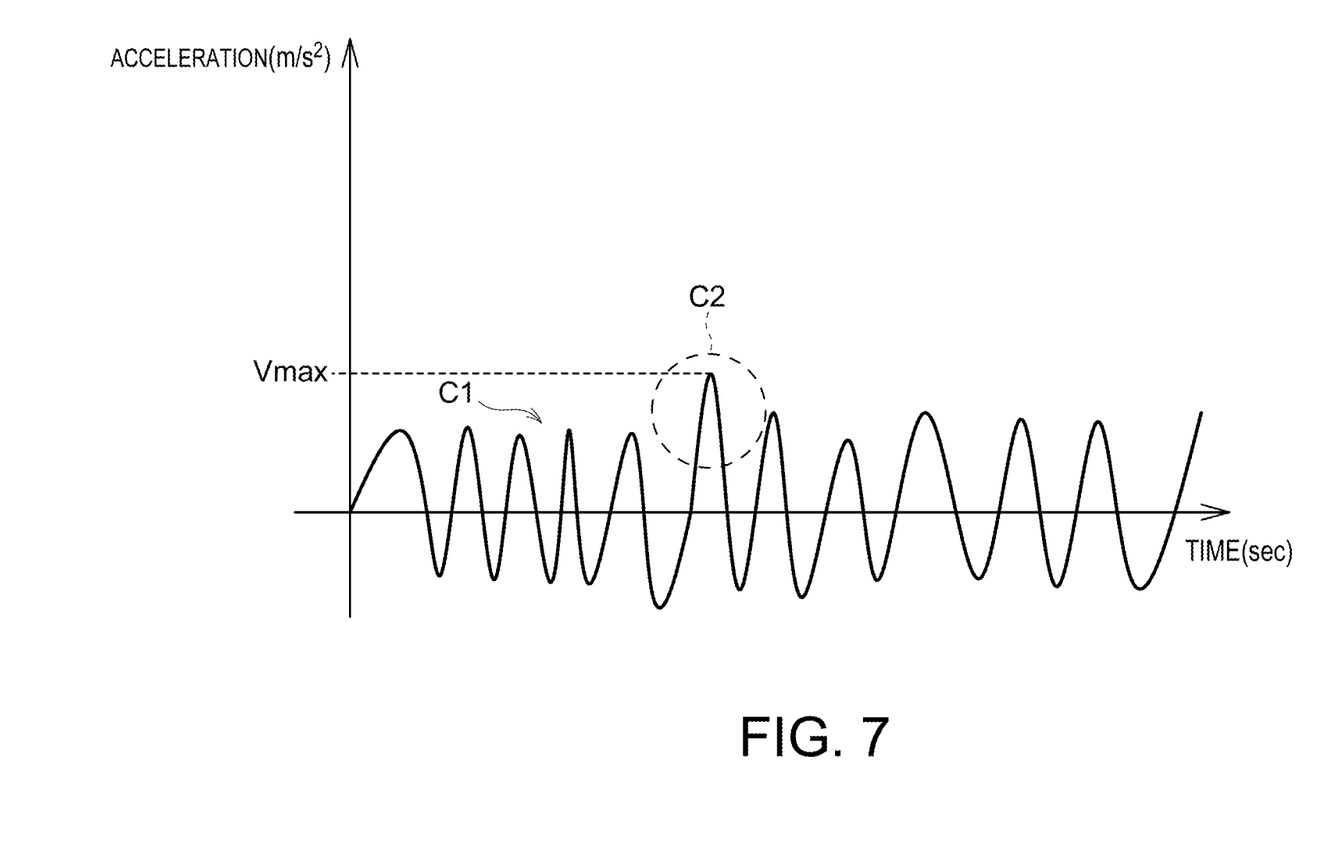
FIG. 7 shows another example of measurement results of the vibration measurement device.

For example, if the relative movement speed of the first sealing member 21 and the second sealing member 22 is slow when the first sealing member 21 and the second sealing member 22 are caused to move from the open position to the closed position, the force (impact load) that the first sealing member 21 and the second sealing member 22 receive from each other tends to be small. In this case, as shown in FIG. 7, the peak value Vmax of the absolute value of the vibration acceleration generated in the first sealing member 21 when the first sealing member 21 and the second sealing member 22 are placed in the closed position is small (see the sign of "C2" in FIG. 7). An erroneous determination is likely to occur as the peak value Vmax of the absolute value of vibration acceleration generated in the first sealing member 21 when the first sealing member 21 and the second sealing member 22 are placed in the closed position approaches the absolute value of vibration acceleration of the noise vibrations (see the sign of "C1" in FIG. 7).

Therefore, from the viewpoint of preventing an erroneous determination of whether the sealing process is good or bad, it is preferable that the peak value Vmax of the absolute value of the vibration acceleration generated in the first sealing member 21 when the first sealing member 21 and the second sealing member 22 are placed in the closed position should be sufficiently larger than the absolute value of the vibration acceleration of the noise vibrations.

The absolute value of the vibration acceleration of the noise vibrations acting on the first sealing member 21 and the second sealing member 22 of a general configuration operating in a general environment is often around 0.5 G (4.905 m/s$^2$). Therefore, for example, the peak absolute value Vmax of the vibration acceleration generated in the first sealing member 21 and the second sealing member 22 when the first sealing member 21 and the second sealing member 22 are placed in the closed position may be 5 G (49.05 m/s$^2$) or more, 4 G (39.24 m/s$^2$) or more, 3G (29.43 m/s$^2$) or more, 2G (19.62 m/s$^2$) or more, or 1G (9.81 m/s$^2$) or more.

Further, the peak value Vmax of the absolute value of the vibration acceleration generated in the first sealing member 21 and the second sealing member 22 when the first sealing member 21 and the second sealing member 22 are placed in the closed position may be 10 times or more, 8 times or more, 6 times or more, 4 times or more, or 2 time or more than the peak value of the absolute value of the vibration acceleration generated in the first sealing member 21 and/or the second sealing member 22 while the first sealing member 21 and the second sealing member 22 are placed in the open position.

In order to achieve a desired value for the peak absolute value of the vibration acceleration generated in the first sealing member 21 and the second sealing member 22 when the first sealing member 21 and the second sealing member 22 are placed in the closed position, the relative movement speed of the first sealing member 21 and the second sealing member 22 may be decided, for example, depending on the type of bags B. Specifically, the sealing drive unit 23 (i.e., the second drive source 24) may cause relative movement between the first sealing member 21 and the second sealing member 22 from the open position to the closed position at a moving speed determined according to the type of bags B, to place the first sealing member 21 and the second sealing member 22 in the closed position.

Next, one example of a bag sealing process method performed by the above-mentioned bag sealing apparatus 10 is explained. The bag sealing process method described below is carried out by appropriately controlling various devices included in the bag sealing apparatus 10 by the control panel 51 (in particular, the drive control section 52).

First, a bag support unit 11 is moved intermittently by the support drive unit 12 in such a manner that a bag B is placed at the sealing process position Ps.

Thereafter, the first sealing member 21 and the second sealing member 22 are moved toward a bag B which is intermittently stopped at the sealing process position Ps, by the sealing drive unit 23. During this movement, while the first sealing member 21 and the second sealing member 22 accelerate, the acceleration has little effect on the vibration state of the first sealing member 21 and the second sealing member 22 and the measurement results of the vibration measurement device 50 are basically dominated by the effect of noise vibrations.

Thereafter, the first sealing member 21 and the second sealing member 22 intermittently stop in the closed position to pinch and seal a bag B positioned at the sealing process position Ps. In this process, the first sealing member 21 and the second sealing member 22 collide against each other via the bag B and stop. Thus, the first sealing member 21 and the second sealing member 22 are subjected to an impact force, so that a large acceleration in a direction opposite to the direction of travel (i.e., in a direction away from the bag B) acts on the first sealing member 21 and the second sealing member 22.

The impact force acting on the first sealing member 21 and the second sealing member 22 causes vibrations in the first sealing member 21 and the second sealing member 22 in this manner, and as a result, the direction of the acceleration acting on the first sealing member 21 and the second sealing member 22 is repeatedly switched. The effects of the vibrations thus created will continue at least for a while during the first sealing member 21 and the second sealing member 22 being intermittently stopped in the closed position. Noise vibrations continues to act on the first sealing member 21 and the second sealing member 22 even while the first sealing member 21 and the second sealing member 22 are stopped in the closed position. Therefore, even though the first sealing member 21 and the second sealing member 22 arranged in the closed position are placed in a state where the first sealing member 21 and the second sealing member 22 appear to be stationary, vibration is actually occurring in the first sealing member 21 and the second sealing member 22.

The vibration generated in the first sealing member 21 is measured by the vibration measurement device 50 in this manner, and the measurement results are sent from the vibration measurement device 50 to the control panel 51 (in particular, the determination section 53). The determination section 53 then determines whether the sealing process is good or bad based on the measurement results of the vibration measurement device 50, and if necessary, causes the display section 54 to display the determination results, causes the alarm section 55 to issue an alarm, and/or causes the memory section 56 to store the determination results.

After the sealing process is completed, a bag B is moved with a bag support unit 11 from the sealing process position Ps.

The bag sealing apparatus 10 may change the transport route of a bag B based on the determination results of the determination section 53 although the drawings do not show such a mechanism. For example, a bag B that has been determined to have a sealing failure may be released from a bag support unit 11 in such a manner that the bag B is not conveyed to a subsequent stage. As an example, a bag support unit 11 driven under the control of the drive control section 52 may release the support of a bag B that has been determined to have a sealing failure, to let the bag B fall, thereby preventing the bag B from being sent to a subsequent stage. Further, a bag support unit 11 driven under the control of the drive control section 52 may separate the destination of a bag B that has been determined to have a sealing failure, from the destination of a bag B that has been determined to having received a good sealing process.

As explained above, the above-mentioned bag sealing apparatus 10 comprises: a bag support unit 11 which supports a bag B; a support drive unit 12 which includes a first drive source 13 and intermittently moves the bag support unit 11 to position the bag B at a sealing process position Ps; a first sealing member 21 and a second sealing member 22 which are provided to be capable of opening and closing, and to perform a sealing process while nipping the bag B by being placed in a closed position in a state where the bag B is positioned in the sealing process position Ps; a sealing drive unit 23 which includes a second drive source 24 provided separately from the first drive source 13, and opens and closes the first sealing member 21 and the second sealing member 22; a vibration measurement device 50 which measures vibration of at least one of the first sealing member 21 and the second sealing member 22; and a determination section (i.e., a determination device) 53 which determines quality of the sealing process according to a measurement result of the vibration measurement device 50 from before the first sealing member 21 and the second sealing member 22 reach the closed position to after the first sealing member 21 and the second sealing member 22 reach the closed position, and the sealing drive unit 23 causes relative movement between the first sealing member 21 and the second sealing member 22 from an open position at a moving speed determined according to a type of the bag B, to place the first sealing member 21 and the second sealing member 22 in the closed position.

According to this bag sealing apparatus 10, the first sealing member 21 and the second sealing member 22 are opened and closed by the sealing drive unit 23 including the second drive source 24 provided separately from the first drive source 13. Further, the first sealing member 21 and the second sealing member 22 are relatively moved from the open position at a moving speed determined by the type of bags B, so that the first sealing member 21 and the second sealing member 22 are placed in the closed position. Thus, it is possible to generate vibrations of a desired state (such as a desired state of acceleration) in the first sealing member 21 and the second sealing member 22 when the first sealing member 21 and the second sealing member 22 are placed in the closed position. Therefore, the bag sealing apparatus 10 described above is advantageous in accurately determining the quality of the bag sealing process from the measurement results of the vibration measurement device 50.

Further, the measurement result of the vibration measurement device 50 includes information about acceleration of vibration of the at least one of the first sealing member 21 and the second sealing member 22, and the determination section 53 determines the quality of the sealing process according to the information about acceleration of vibration derived from the measurement result of the vibration measurement device 50.

According to this configuration, the quality of the bag sealing process can be accurately determined.

The above-described bag B sealing method comprises the steps of: positioning a bag B at a sealing process position Ps; causing relative movement between a first sealing member 21 and a second sealing member 22 from an open position to a closed position in such a manner that the first sealing member 21 and the second sealing member 22 nip the bag B positioned at the sealing process position Ps to perform a sealing process of the bag B; measuring vibration of at least one of the first sealing member 21 and the second sealing member 22 by a vibration measurement device 50; and determining quality of the sealing process according to a measurement result of the vibration measurement device 50 from before the first sealing member 21 and the second sealing member 22 reach the closed position to after the first sealing member 21 and the second sealing member 22 reach the closed position, and the relative movement between the first sealing member 21 and the second sealing member 22 from the open position to the closed position is performed in such a manner that an absolute value of acceleration of vibration which occurs in the at least one of the first sealing member 21 and the second sealing member 22 by placing the first sealing member 21 and the second sealing member 22 in the closed position as a result of the relative movement is larger than an absolute value of acceleration of vibration which occurs in the at least one of the first sealing member 21 and the second sealing member 22 in a state where the first sealing member 21 and the second sealing member 22 are placed in the open position.

According to this bag sealing method, the first sealing member 21 and the second sealing member 22 are moved relative to each other from the open position to the closed position in such a manner that the first sealing member 21 and the second sealing member 22 exhibit an absolute value of acceleration of vibration that is greater than the absolute value of acceleration of vibration that occurs in a state where the first sealing member 21 and the second sealing member 22 are placed in the open position. Therefore, it is advantageous in accurately determining the quality of the bag sealing process from the measurement result of the vibration measurement device 50.

The maximum value of the absolute value of acceleration of vibration which occurs in the at least one of the first sealing member 21 and the second sealing member 22 by placing the first sealing member 21 and the second sealing member 22 in the closed position as a result of the relative movement may be 49.05 m/s$^2$ or more.

In this case, it is easier to clearly distinguish the vibration caused by the impact load acting on the first sealing member 21 and the second sealing member 22 due to the first sealing member 21 and the second sealing member 22 being placed in the closed position, from the noise vibration, thus effectively avoiding erroneous determinations.

Further, the first sealing member 21 and the second sealing member 22 are relatively moved from the open position to the closed position at a moving speed determined according to a type of the bag B.

In this case, vibrations of a desired acceleration can be generated in the first sealing member 21 and the second sealing member 22 when the first sealing member 21 and the second sealing member 22 are placed in the closed position, and thus the quality of sealing process of a bag can be accurately determined.

MODIFICATION EXAMPLES

In the above-described embodiment, it is determined, based on the peak value Vmax of the absolute value of the vibration acceleration, whether the quality of the sealing process is good or bad; however, it may be determined, based on other state quantities of the vibration occurs in the first sealing member 21 and/or the second sealing member 22, whether the quality of the sealing process is good or bad.

For example, the determination section 53 may determine whether the sealing process is good or bad, based on the amount of change in vibration acceleration per unit time before and after the peak value Vmax of the absolute value of vibration acceleration is exhibited. In general, the amount of change in vibration acceleration per unit time tends to be smaller in cases where there is a foreign object between the first sealing member 21 and the second sealing member 22, compared to in cases where there is no foreign object between the first sealing member 21 and the second sealing member 22.

Hence, the determination section 53 may determine whether the sealing process is good or bad, based on whether the amount of change in the vibration acceleration per unit time of the first sealing member 21 and/or the second sealing member 22 (e.g., the amount of change in the vibration acceleration per unit time before and after the peak value Vmax of the absolute value of the vibration acceleration is exhibited) obtained from the measurement results of the vibration measurement device 50 is greater than a judgment criterion value. Specifically, if the change in vibration acceleration per unit time is greater than the judgment criterion value, the determination section 53 may determine that the sealing process has been performed well, and if the change in vibration acceleration per unit time is equal to or less than the judgment criterion value, the determination section 53 may determine that a sealing failure might have occurred.

In the above-mentioned embodiment, the state quantity of vibration (in the above-mentioned embodiment, acceleration) occurring in the first sealing member 21 is measured by the vibration measurement device 50 and is used for determining whether the sealing process is good or bad; however, the state quantity of vibration occurring in the second sealing member 22 may be measured by the vibration measurement device 50 and be used for determining whether the sealing process is good or bad. Further, the state quantity of vibration occurring in both the first sealing member 21 and the second sealing member 22 may be measured by the vibration measurement device 50 and be used for determining whether the sealing process is good or bad.

The opening-closing movement of the first sealing member 21 and the second sealing member 22 may be performed by a single drive source (i.e., the second drive source 24) as in the embodiment described above or may be performed respectively by drive sources which are separately provided. Further, the relative opening-closing movement of the first sealing member 21 and the second sealing member 22 may be performed by moving only one of the first sealing member 21 and the second sealing member 22.

The present disclosure is not limited to the embodiments and modification examples described above. For example, various variations may be added to each element of the above-described embodiments and modification examples, and configurations may be combined partially or entirely among the above-described embodiments and modification examples. Further, the effects produced by this disclosure are also not limited to the effects described above, and effects specific to the particular configuration of each embodiment can also be exerted. As described above, various additions, changes, and partial deletions can be made to each element described in the claims, specification, abstract, and drawings without departing from the technical idea and the purpose of the present disclosure.

The invention claimed is:

1. A bag sealing apparatus comprising:
    a bag support unit which supports a bag;
    a support drive unit which includes a first drive source and intermittently moves the bag support unit to position the bag at a sealing process position;
    a first sealing member and a second sealing member which are provided to be capable of opening and closing, and to perform a sealing process while nipping the bag by being placed in a closed position in a state where the bag is positioned in the sealing process position;
    a sealing drive unit which includes a second drive source provided separately from the first drive source, and opens and closes the first sealing member and the second sealing member;
    a vibration measurement device which measures vibration of at least one of the first sealing member and the second sealing member; and
    a determination device which determines quality of the sealing process according to a measurement result of the vibration measurement device from before the first sealing member and the second sealing member reach the closed position to after the first sealing member and the second sealing member reach the closed position,
    wherein the sealing drive unit causes relative movement between the first sealing member and the second sealing member from an open position at a moving speed determined according to a type of the bag, to place the first sealing member and the second sealing member in the closed position.

2. The bag sealing apparatus as defined in claim 1, wherein:
    the measurement result of the vibration measurement device includes information about acceleration of vibration of the at least one of the first sealing member and the second sealing member, and
    the determination device determines the quality of the sealing process according to the information about acceleration of vibration derived from the measurement result of the vibration measurement device.

3. A bag sealing method comprising the steps of:
    positioning a bag at a sealing process position;
    causing relative movement between a first sealing member and a second sealing member from an open position to a closed position in such a manner that the first sealing member and the second sealing member nip the bag positioned at the sealing process position to perform a sealing process of the bag;
    measuring vibration of at least one of the first sealing member and the second sealing member by a vibration measurement device; and
    determining quality of the sealing process according to a measurement result of the vibration measurement device from before the first sealing member and the second sealing member reach the closed position to after the first sealing member and the second sealing member reach the closed position,
    wherein the relative movement between the first sealing member and the second sealing member from the open position to the closed position is performed in such a manner that an absolute value of acceleration of vibration which occurs in the at least one of the first sealing member and the second sealing member by placing the first sealing member and the second sealing member in the closed position as a result of the relative movement is larger than an absolute value of acceleration of vibration which occurs in the at least one of the first sealing member and the second sealing member in a state where the first sealing member and the second sealing member are placed in the open position.

4. The bag sealing method as defined in claim 3, wherein a maximum value of the absolute value of acceleration of vibration which occurs in the at least one of the first sealing member and the second sealing member by placing the first sealing member and the second sealing member in the closed position as a result of the relative movement is 49.05 $m/s^2$ or more.

5. The bag sealing method as defined in claim 3, wherein the first sealing member and the second sealing member are relatively moved from the open position to the closed position at a moving speed determined according to a type of the bag.

6. The bag sealing method as defined in claim 4, wherein the first sealing member and the second sealing member are relatively moved from the open position to the closed position at a moving speed determined according to a type of the bag.

* * * * *